(12) United States Patent
Mosteiro Goyoaga

(10) Patent No.: US 9,956,838 B2
(45) Date of Patent: May 1, 2018

(54) METHOD FOR OBTAINING A SUSPENSION ARM FOR AUTOMOTIVE VEHICLES AND SUSPENSION ARM

(71) Applicant: Engineering Developments for Automotive Industry, S.L., Amorebieta-Etxano (Bizkaia) (ES)

(72) Inventor: Jose Ramön Mosteiro Goyoaga, Amorebieta (ES)

(73) Assignee: Engineering Developments for Automotive Industry, S.L., Amorebieta-Etxano (Bizkaia) (ES)

( * ) Notice: Subject to any disclaimer, the term of this patent is extended or adjusted under 35 U.S.C. 154(b) by 0 days. days.

(21) Appl. No.: 15/198,950

(22) Filed: Jun. 30, 2016

(65) Prior Publication Data

US 2017/0001489 A1 Jan. 5, 2017

(30) Foreign Application Priority Data

Jul. 2, 2015 (EP) ..................................... 15382353

(51) Int. Cl.
  *B60G 7/00* (2006.01)
  *B21D 53/88* (2006.01)
  *B23P 15/00* (2006.01)

(52) U.S. Cl.
  CPC ............. *B60G 7/001* (2013.01); *B21D 53/88* (2013.01); *B23P 15/00* (2013.01);
  (Continued)

(58) Field of Classification Search
  CPC ............................ B60G 7/001; B23P 2700/14
  (Continued)

(56) References Cited

U.S. PATENT DOCUMENTS

| 3,121,348 A | 2/1964 | Reed |
| 6,030,570 A | 2/2000 | McLaughlin |

(Continued)

FOREIGN PATENT DOCUMENTS

| DE | 202013105002 | 11/2013 |
| EP | 0479598 | 4/1992 |

(Continued)

OTHER PUBLICATIONS

Extended Search Report for European Patent Application No. 15382353.9 (dated Dec. 14, 2015).

*Primary Examiner* — Faye M Fleming
(74) *Attorney, Agent, or Firm* — Klarquist Sparkman, LLP

(57) ABSTRACT

This disclosure relates to methods for obtaining a suspension arm for automotive vehicles, wherein certain embodiments comprise obtaining two identical parts to form a body, where each part is obtained by means of:
  a) cutting a metal or composite sheet forming a base plane, such that a central segment and two ends are defined,
  b) drawing at least one hole in each end,
  c) stamping each part forming in its central segment two flanges consisting of a first flange and a second flange located on opposite sides of the central segment and oriented perpendicular to the base plane, where said flanges have an asymmetrical arrangement with respect to a midplane passing through the geometric centers of the holes of the two ends and is perpendicular to the base plane, the second flange being separated from the midplane a distance equal to the separation of the first flange from the midplane plus a distance at least equal to the value of the thickness of the sheet or plate.

13 Claims, 11 Drawing Sheets

(52) U.S. Cl.
CPC .... *B23P 2700/14* (2013.01); *B60G 2206/013* (2013.01); *B60G 2206/10* (2013.01); *B60G 2206/11* (2013.01); *B60G 2206/7104* (2013.01); *B60G 2206/72* (2013.01); *B60G 2206/73* (2013.01); *B60G 2206/80* (2013.01); *B60G 2206/811* (2013.01); *B60G 2206/8102* (2013.01); *B60G 2206/8103* (2013.01); *B60G 2206/8104* (2013.01); *B60G 2206/8201* (2013.01); *B60G 2206/83* (2013.01)

(58) Field of Classification Search
USPC .................................................. 280/124.134
See application file for complete search history.

(56) References Cited

U.S. PATENT DOCUMENTS

| | | | |
|---|---|---|---|
| 7,740,255 B2 * | 6/2010 | Holt | B60G 7/001 |
| | | | 280/124.11 |
| 8,167,325 B2 * | 5/2012 | Lee | B60G 3/202 |
| | | | 280/124.128 |
| 8,752,850 B2 * | 6/2014 | Ueno | B60G 7/001 |
| | | | 280/124.121 |
| 9,233,587 B2 * | 1/2016 | Korte | B21D 53/90 |

FOREIGN PATENT DOCUMENTS

| | | | | |
|---|---|---|---|---|
| EP | 1329343 | | 7/2003 | |
| ES | 2285410 T3 | | 11/2007 | |
| JP | S58188712 A | | 11/1983 | |
| WO | WO01/42034 | | 6/2001 | |
| WO | WO-2014147834 A1 * | | 9/2014 | B60G 7/001 |

* cited by examiner

METHOD FOR OBTAINING A SUSPENSION ARM FOR AUTOMOTIVE VEHICLES AND SUSPENSION ARM

CROSS REFERENCE TO RELATED APPLICATION

The present application claims priority from pending European Patent Application No. 15382353.9, filed Jul. 2, 2016, which is incorporated herein by reference.

TECHNICAL FIELD

The present invention applies in the industry of components for automotive vehicles, and more specifically in the field of multi-link suspensions.

BACKGROUND

In a multi-link suspension, the wheels are attached to a central sub-frame of a vehicle by means of a plurality of arms linking or attaching the wheel stub axle with said sub-frame. Such suspensions are the object of recent technological developments made in the automotive industry. The main advantage of such suspensions is the high lateral stiffness they confer to the vehicle, thereby preventing the phenomenon known as oversteering. They also provide better directional stability in the direction of travel and allow absorbing a high percentage of vibrations and noises. In summary, with respect to suspensions of another type, multi-link suspensions provide the vehicle with greater maneuverability, safety and superior travel comfort.

The elements comprised in such suspensions include, among others, suspension arms, which are kinematic elements the function of which is to statically and dynamically define the relative position of the wheel with respect to the vehicle frame while at the same transmitting part of the stresses of the wheel to the body, and vice versa.

Today, there is a wide range of suspension arms which are obtained by means of different processes, among which stamping a sheet, forging or smelting pieces of aluminum or steel and welding bushings to tubes can be mentioned. All cases require achieving sufficient stiffness regardless of the operating or working temperature of the vehicle suspension.

A series of documents representing the most relevant and recent state of the art in reference to suspension arms is mentioned below.

Patent document JPS58188712 describes a coupling rod formed by two identical parts that are attached by means of welding applied on their flanges, said flanges being perpendicular to the longitudinal axes of the bearings. The two identical parts are shaped according to a multi-step sheet stamping and die-cutting process, said parts being symmetrical with respect to their longitudinal axis in addition to being identical. Both parts are then placed facing one another, rotating one of them 180° with respect to its longitudinal axis, and they are attached by means of spot welding on their flanges, although use of weld beads is also contemplated. Finally, the elastic bearings are introduced in the cylindrical portions and set in place. Although the fact of having identical parts reduces production costs, the facing arrangement of these parts, which also determines the configuration of their attachment shape, is far from being mechanically efficient considering the stiffness and weight of the rod.

In this same sense, patent document U.S. Pat. No. 3,121,348 describes a coupling rod formed by two identical parts that are attached by means of a weld bead applied on their flanges, unlike the case mentioned in the preceding paragraph, said flanges being parallel to the longitudinal axes of the elastic bearings. Like in the preceding case, the two identical parts are shaped according to a sheet stamping and die-cutting process, said parts being identical and symmetrical with respect to their longitudinal axis. To attach them, the parts are placed facing one another, rotating one of them 180° with respect to its longitudinal axis, and they are attached by means of a weld bead applied on their flanges. Finally, the elastic bearings are introduced in the cylindrical openings and set in place. Similarly, this arm has the limitations indicated for the preceding case.

On the other hand, patent document ES2285410T describes a suspension control arm comprising two U-shaped stamped metal parts that are attached to one another by their flanges by means of weld beads, where the flanges are parallel to the longitudinal axes of the elastic bearings. From the mechanical efficiency viewpoint, this arm is better than the two preceding arms as the attachment is formed with a overlap between said flanges; however, unlike the two preceding cases, in order to achieve said arrangement it is necessary to start from two parts that are not only asymmetrical but which are also different from one another, which increases production costs.

Therefore, in view of the foregoing a solution that is a compromise among production costs of the suspension arms for automotive vehicle multi-link suspensions, their weight and their mechanical characteristics is susceptible to improvement.

DESCRIPTION

A first aspect of the present invention relates to a method for obtaining a suspension arm for automotive vehicles which allows reducing the costs and weight, in addition to improving the mechanical characteristics of the arm, physically attaching the connecting elements of the arm, either ball and socket or elastic joints, that are housed at the ends of said arm.

This objective is achieved by means of a method with the features of claim 1 and the arm according to claim 12.

The method for obtaining a suspension arm for automotive vehicles proposed by the invention comprises obtaining two identical parts to form a body, where each part is obtained by means of the following sequential steps:

a) cutting sheet metal or sheet made of composite material, known as composite sheet, forming a base plane, such that a central segment and two ends are defined, where said central segment is slim or at least thinner than the ends, b) drawing or shaping at least one hole or circular opening in an area corresponding to each end, where each hole has a geometric center According to the invention, the method comprises the following sequential steps:

c) stamping or shaping each part forming in its central segment two flanges consisting of a first flange and a second flange located on opposite sides of the central segment and oriented perpendicular to the base plane, i.e., in a direction of the axes of the bearing pedestal, where said flanges have an asymmetrical arrangement with respect to a midplane passing through the geometric centers of the holes of the two ends and is perpendicular to the base plane, the second flange being separated from the midplane a distance equal to the separation of the first flange from the midplane plus a distance at least equal to the value of the thickness of the sheet, d) starting from two parts in the same position, rotating a first part 180° with respect to a longitudinal axis defined between the geometric centers of the holes of both ends until both parts are facing and with their corresponding base planes parallel to one another, moving both parts closer with the corresponding geometric centers of the hole aligned or coaxial with one another until the webs are at a specific distance, the flanges of both parts being fitted to and overlapping one another such that a overlap is defined in the flanges, a profile which may or may not be closed being able to be formed depending on if the flanges of both sheets are in contact.

Obviously, the cross-section of the coupling rod is not constant and it progresses from the center to the ends to form openings housing the elastic bearings or ball and socket joints What makes the invention possible is that one of the flanges is shifted a distance equal to or greater than the thickness of the sheet with respect to the plane passing through the longitudinal axes of the elastic bearings, such that the identical parts are not completely symmetrical.

It can actually be said that in the invention there is a transition in the cross-section from the asymmetrical central portion where a flange is shifted to the end portions housing the elastic bearings where symmetry with respect to the plane passing through the longitudinal axes of the elastic bearings at some point is recovered. This technical feature can be seen in the drawings.

The arm obtained by means of the method of the invention allows broadening the fields of design for lightweight frame components in the automotive industry, such as for example:

1.—Possibility of a wide range of suspension arms due to different final shapes of the body obtainable in the stamping process.

2.—Possibility of housing ball and socket or elastic joints. It is possible to overmold a plastic material where the ball and socket joint would be housed at both ends for integrating the components necessary in a ball and socket joint. The idea is to broaden the inventive description not only to suspension arms but also to links. This therefore involves an even wider range for the application of the invention.

3.—Capacity of adapting to different storage requirements.

The arm obtained by means of the method of the invention furthermore has the following features and advantages:

1.—Coupling rod weight reduction. By maintaining the weight of the auxiliary elements, a weight reduction greater than 10% can be achieved in the structure of the metal body compared with other concepts made of steel existing on the market, 2.—Since the flanges of both sheets overlap one another, a profile having greater inertia in a specific space is obtained and superior mechanical properties compared to other existing coupling rods having the same mass are obtained.

3.—Smaller dimensions for the same mechanical properties.

4.—The mentioned object of the invention combines the advantages of a smaller investment in tools as it only requires a die since both parts are identical, with greater simplicity in the manufacture since complex stamping operations are not required. Furthermore, as an additional advantage of obtaining two sheets from a single die, the fact that wear occurs in the die will not affect the fitting of the sheets to one another since the error will be identical in both sheets. In contrast, if there were two dies the wear in said dies may not be the same. As a result, the tools will have a longer service life and a lower maintenance cost. All this results in cost savings.

5.—If it is necessary to attach both sheets to one another, it can be done by means of applying a weld in the contact areas between the flanges of both sheets, being easier than in other coupling rods existing on the market in which butt welding is performed, as in this case it is a overlap weld. Another way to attach the sheets to one another would be to attach them in the contact areas of the recesses made in the central portion, either by means of welding or any other method. These two methods can furthermore be combined with one another.

6.—Advisable manufacturing process for mass production.

7.—Recycling surplus material or material used in the part once its life cycle has ended.

A second aspect of the invention relates to a suspension arm for automotive vehicle multi-link suspensions which can be obtained by means of the method described above.

DESCRIPTION OF THE DRAWINGS

To complement the description that is being made and for the purpose of aiding to better understand the features of the invention according to a preferred practical embodiment thereof, a set of drawings is attached as an integral part of said description in which the following has been depicted in an illustrative and non-limiting character.

PREFERRED EMBODIMENT

Figure 1:
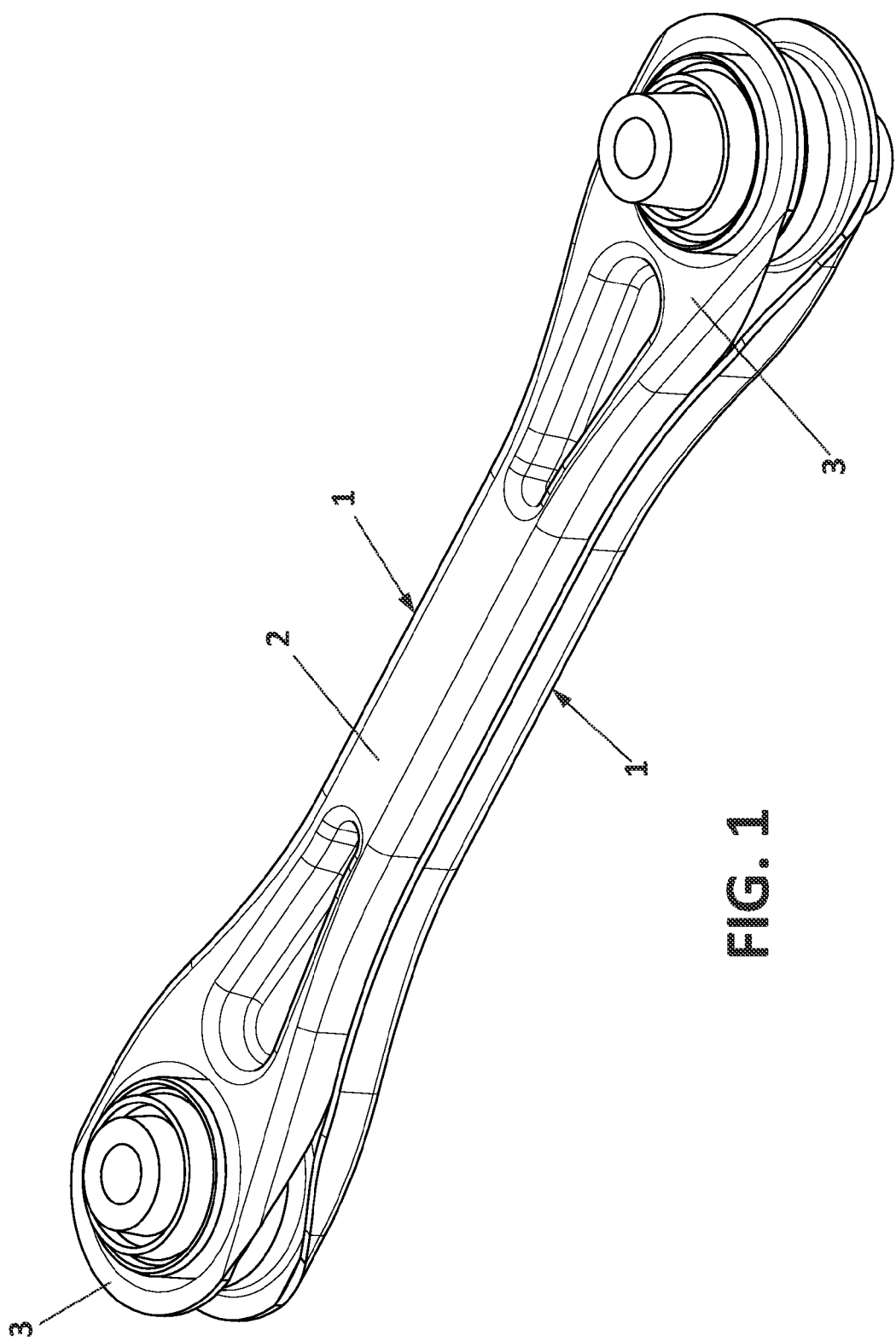
FIG. 1 shows a schematic perspective view of a first embodiment of the suspension arm obtained with the method of the invention, in which the connecting elements are elastic bearings and the flanges are not in contact and the attachment is formed by means of welding in the drawn central areas.
Figure 2:
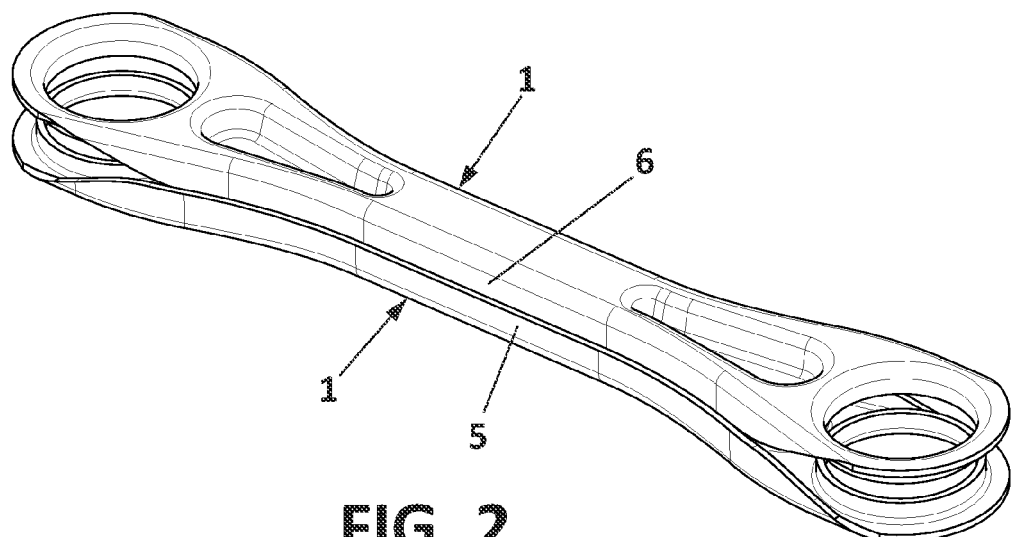
FIG. 2 shows a perspective view like that of FIG. 1 with the two identical parts arranged in their final position, but without the connecting elements.
Figure 3:
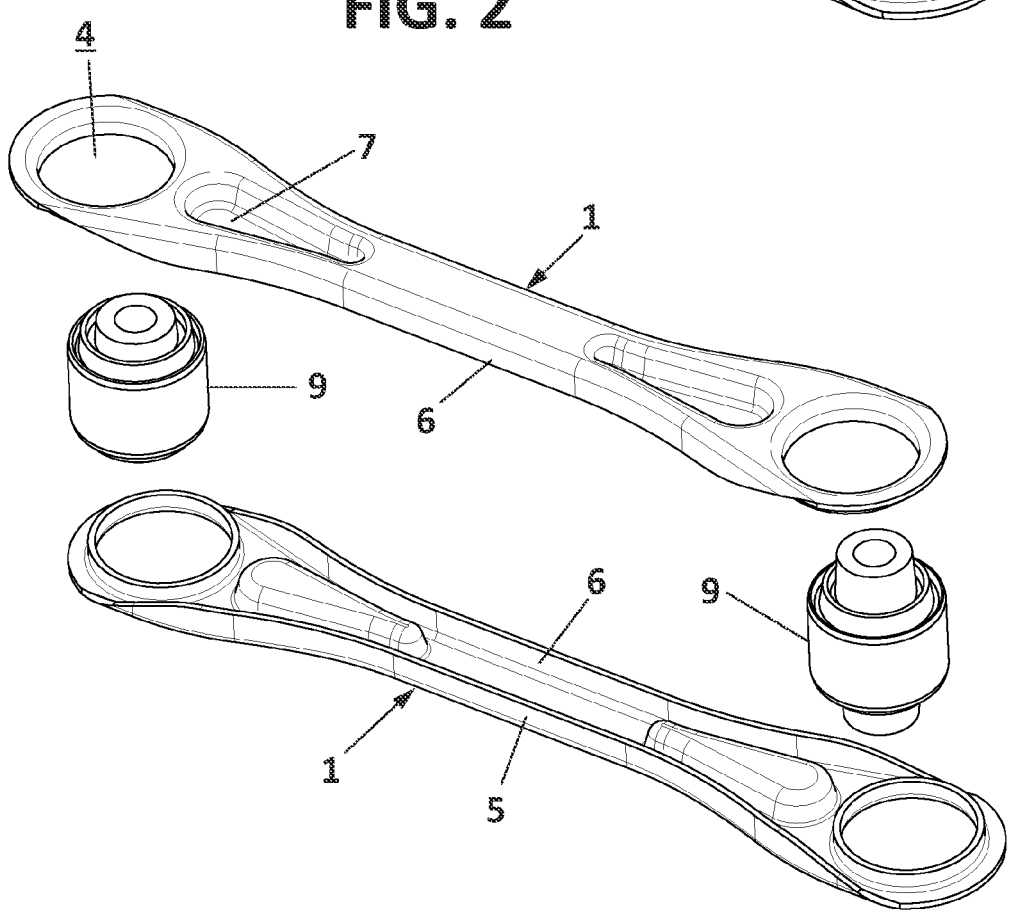
FIG. 3 shows an exploded view of the two identical parts obtained from stamped sheet and the connecting elements comprised in the first embodiment of the suspension arm of the invention.
Figure 4:
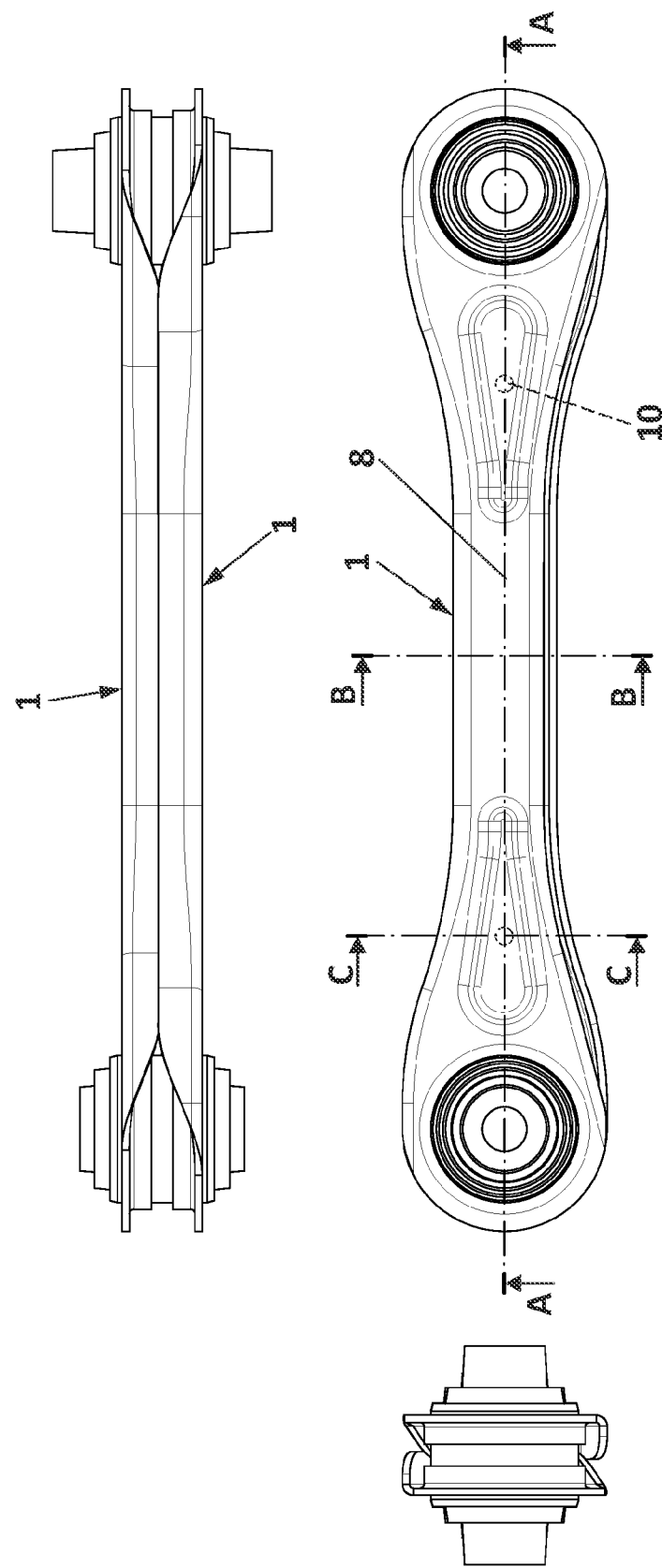
FIG. 4 shows three top, front and side views of the first embodiment of the arm of the invention.
Figure 5:
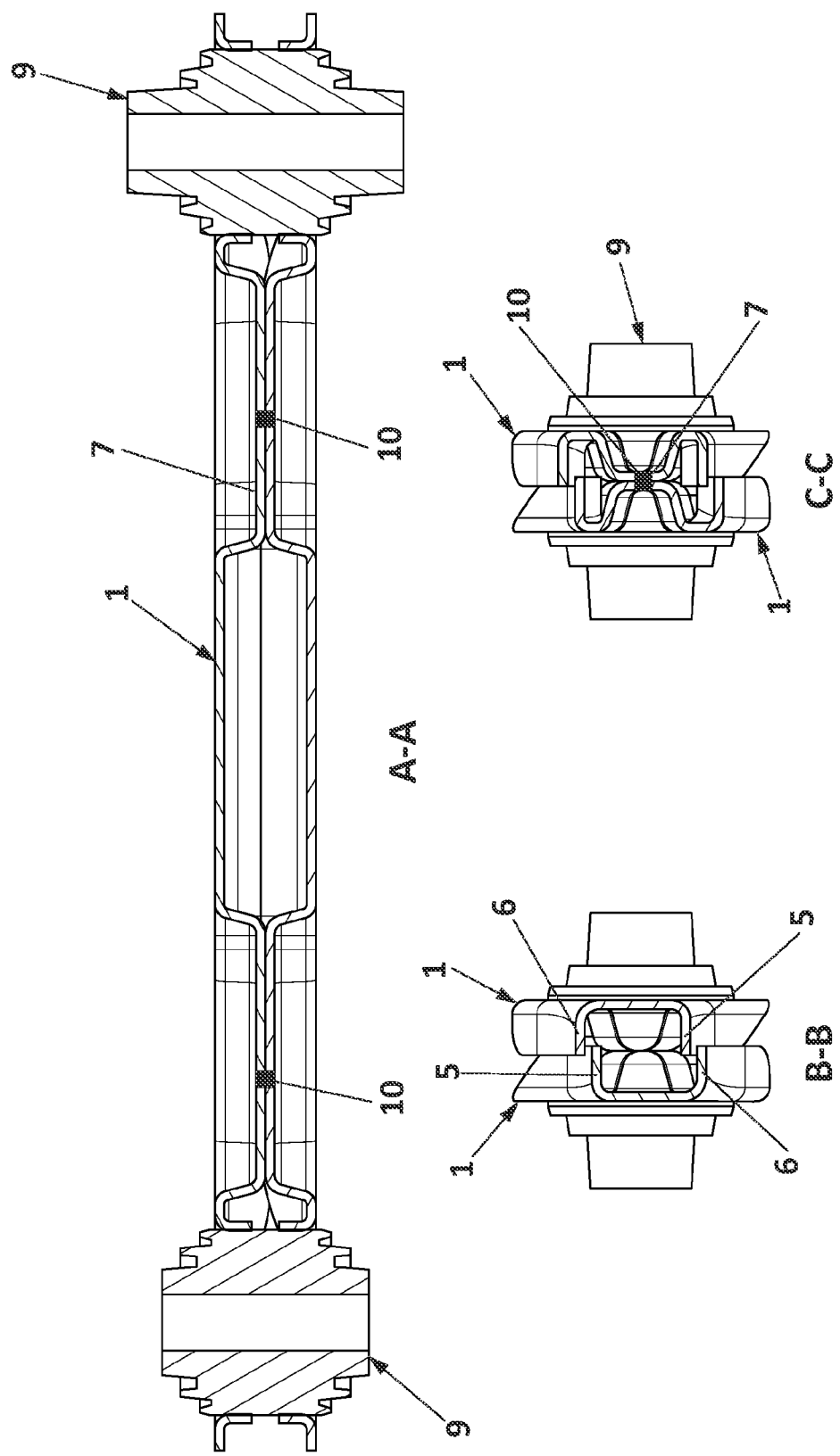
FIG. 5 shows three sections indicated in FIG. 4 of the first embodiment of the suspension arm of the invention depicted in the preceding drawings.

In view of the mentioned drawings it can be observed how in one of the possible embodiments of the invention the method proposed by the invention comprises obtaining two identical parts (1) to form a body, where each part (1) is obtained by means of the following sequential steps:

a) cutting preferably a sheet metal forming a base plane, such that a central segment (2) and two ends (3) are defined, where said central segment is slim or at least thinner than the ends, b) drawing at least one hole (4) or circular opening in an area corresponding to each end (3), where each hole (4) has a geometric center.

According to the invention, the method comprises the following sequential steps:

c) stamping each part (1) forming in its central segment (2) two flanges (5, 6) consisting of a first flange (5) and a second flange (6) located on opposite sides of the central segment (2) and oriented perpendicular to the base plane, i.e., in a direction of the axes of the bearing pedestal, where said flanges (5, 6) have an asymmetrical arrangement with respect to a midplane passing through the geometric centers of the holes (4) of the two ends (3) and is perpendicular to the base plane, the second flange (6) being separated from the midplane a distance equal to the separation of the first flange (5) from the midplane plus a distance at least equal to the value of the thickness of the sheet, d) starting from two parts (1) in the same position, rotating a first part (1) 180° with respect to a longitudinal axis defined between the geometric centers of the holes (4) of both ends (3) until both parts (1) are facing and their corresponding base planes are parallel to one another, moving both parts (1) closer, until the webs are at a specific distance, the flanges (5, 6) of both parts (1) being fitted to and overlapping one another, such that a overlap is defined in the flanges (5, 6), a profile which may or may not be closed being able to be formed depending on if the flanges of both sheets are in contact.

FIGS. 1 to 5 show a first embodiment of the suspension arm obtained with the method of the invention, in which the connecting elements (9) are elastic bearings and the flanges (5, 6) are not in contact and the attachment is formed by means of spot welding (10) in the drawn central areas (7). In this case, the flanges (5, 6) are not in contact, so the second flange (6) is separated from the midplane a distance equal to the separation of the first flange (5) from the midplane plus a distance greater than value of the thickness of the sheet, so it can be said that the profile is open.

Figure 6:
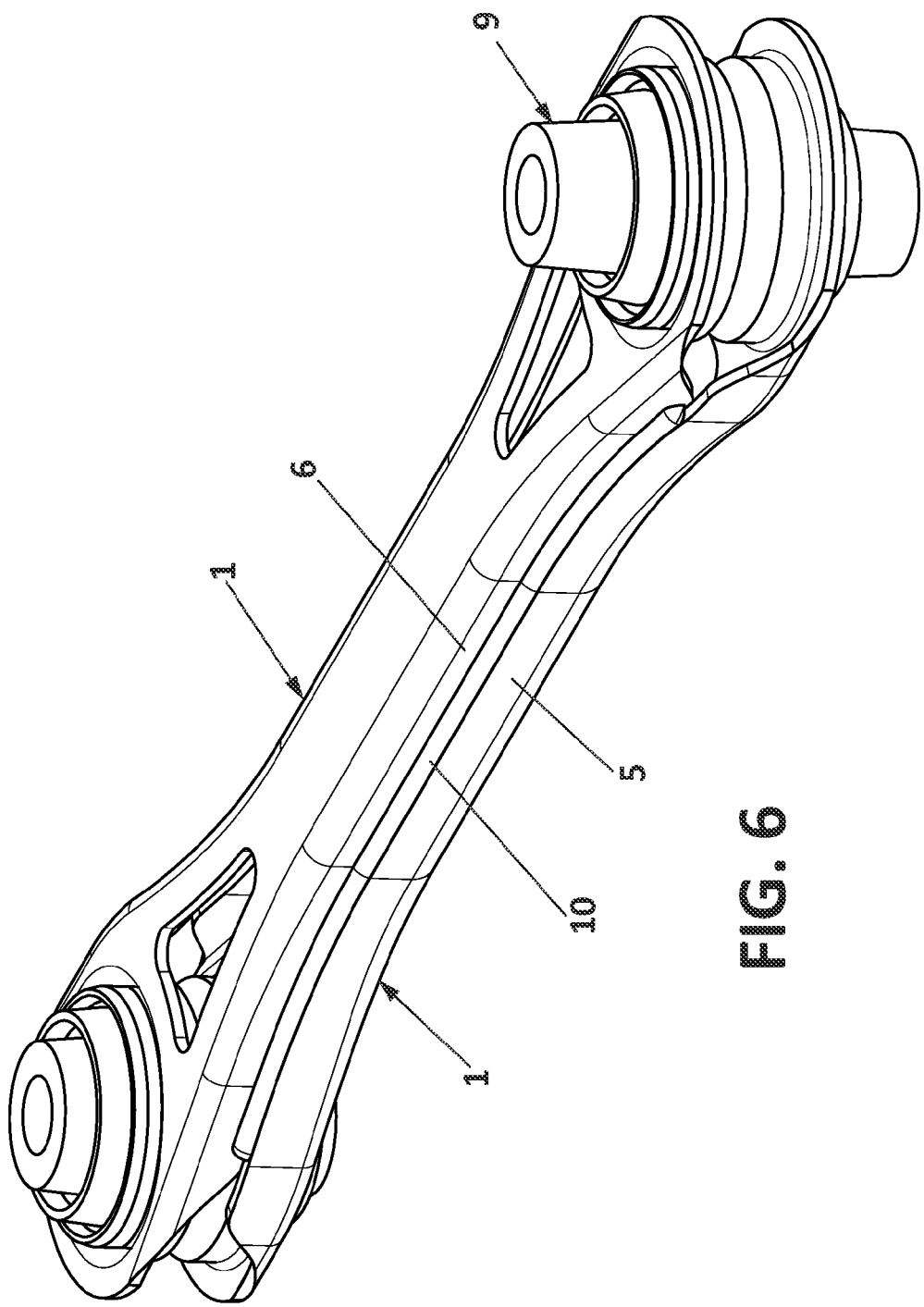
FIG. 6 shows a schematic perspective view of a second embodiment of the suspension arm obtained with the method of the invention, in which the connecting elements are elastic bearings and there are holes instead of drawn central areas, the flanges being in contact and the attachment being formed precisely in the overlap area of the flanges.
Figure 7:
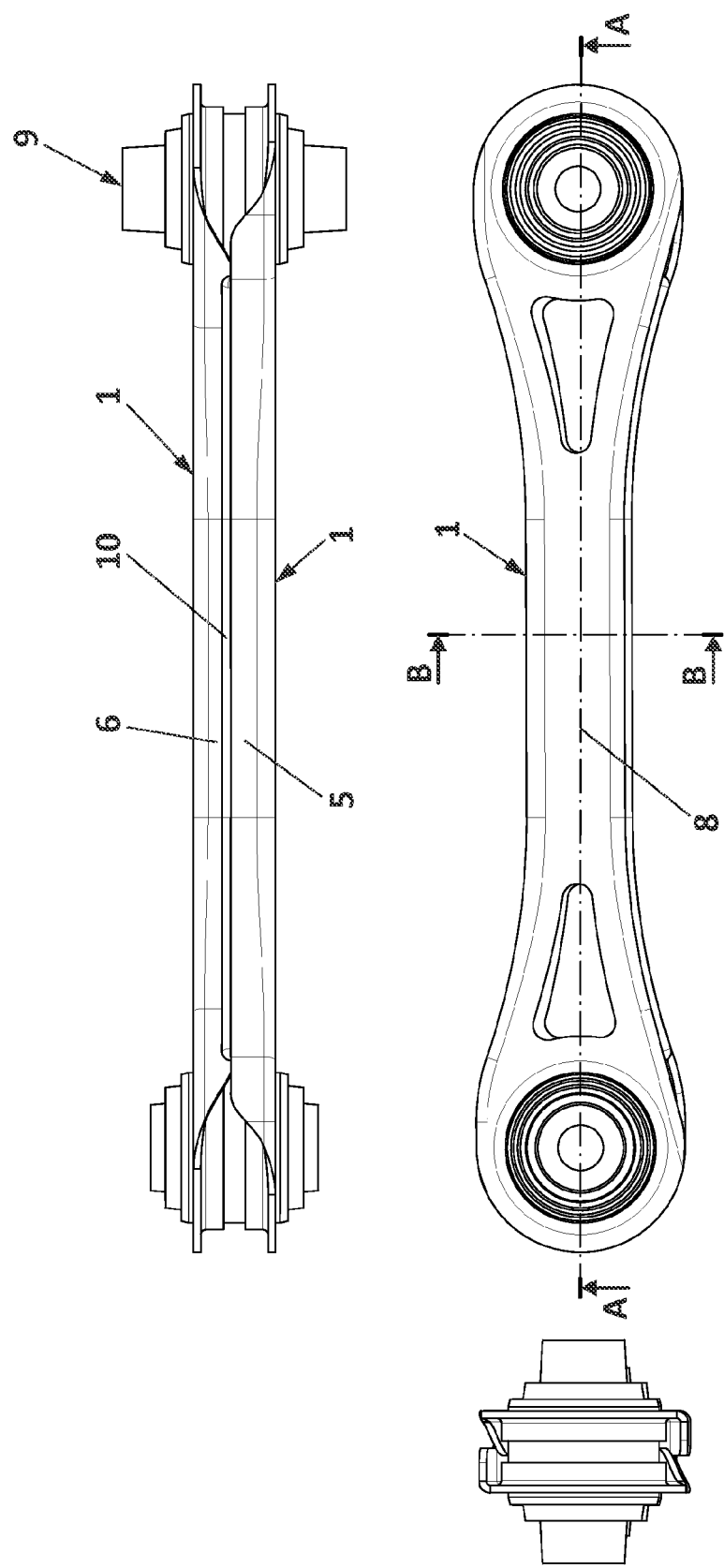
FIG. 7 shows three top, front and side views of the second embodiment of the arm of the invention.
Figure 8:
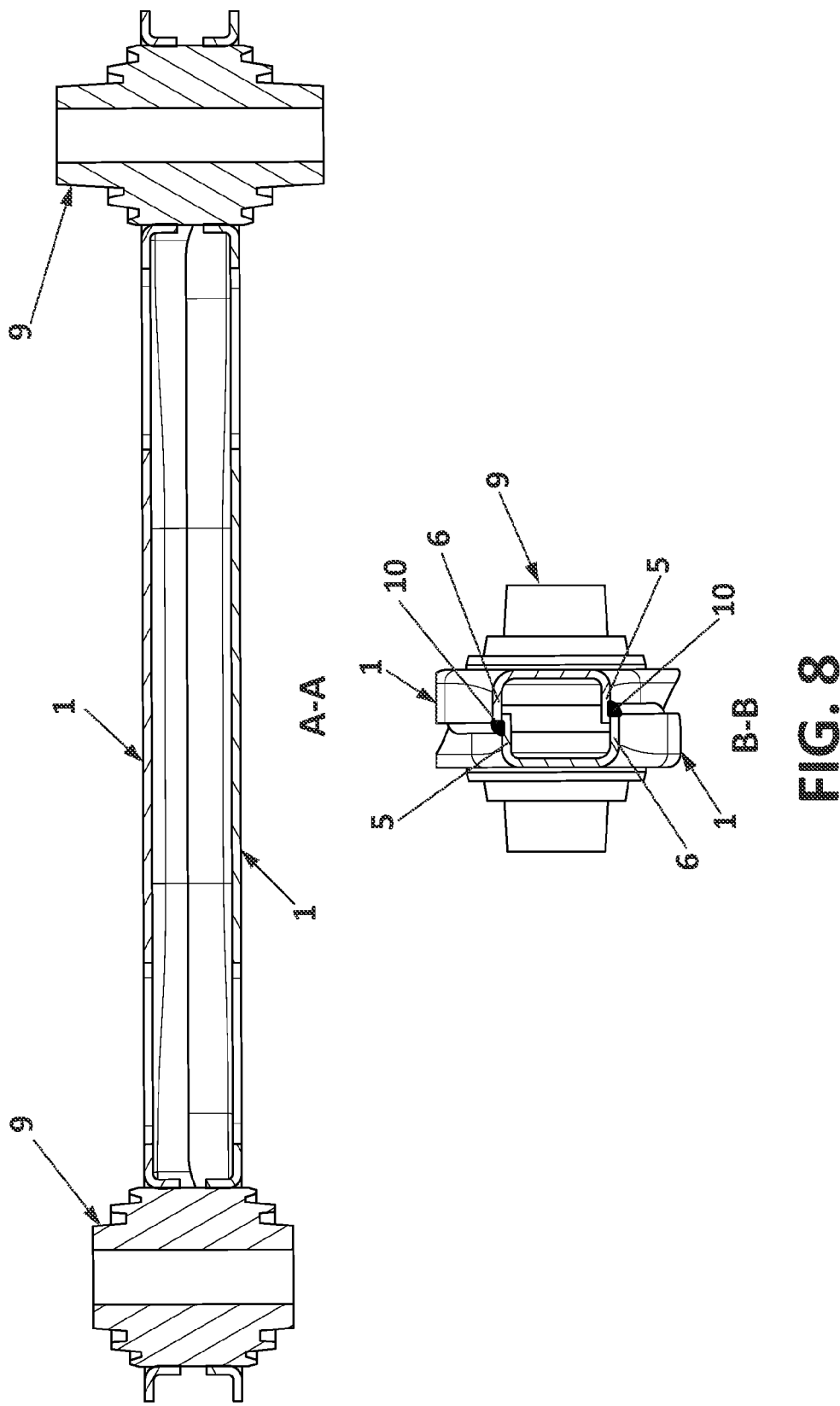
FIG. 8 shows two sections indicated in FIG. 7 of the second embodiment of the suspension arm of the invention.
Figure 9:
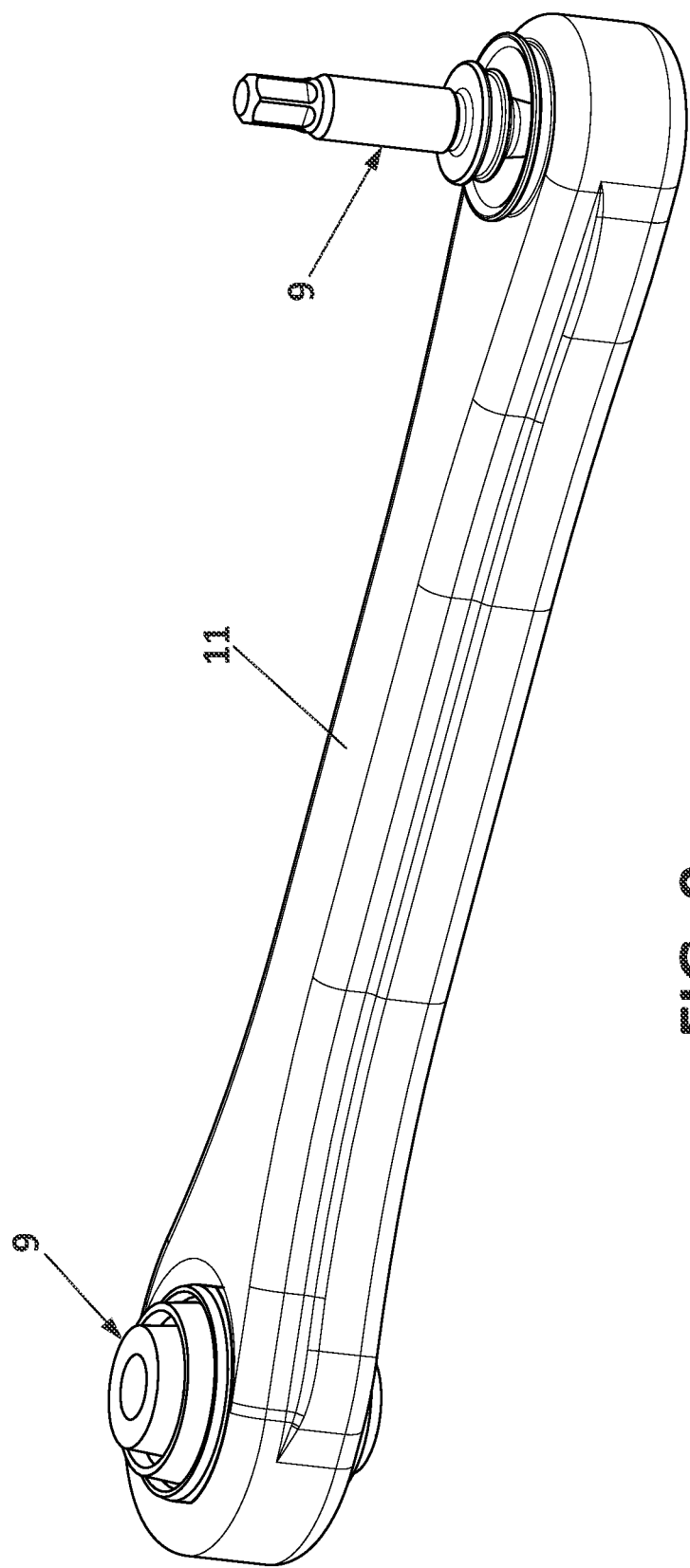
FIG. 9 shows a schematic perspective view of a third embodiment of the suspension arm obtained with the method of the invention, in which the connecting elements are an elastic bearing and a ball and socket joint, the flanges are in contact and the attachment is formed by means of overmolding a plastic material.
Figure 10:
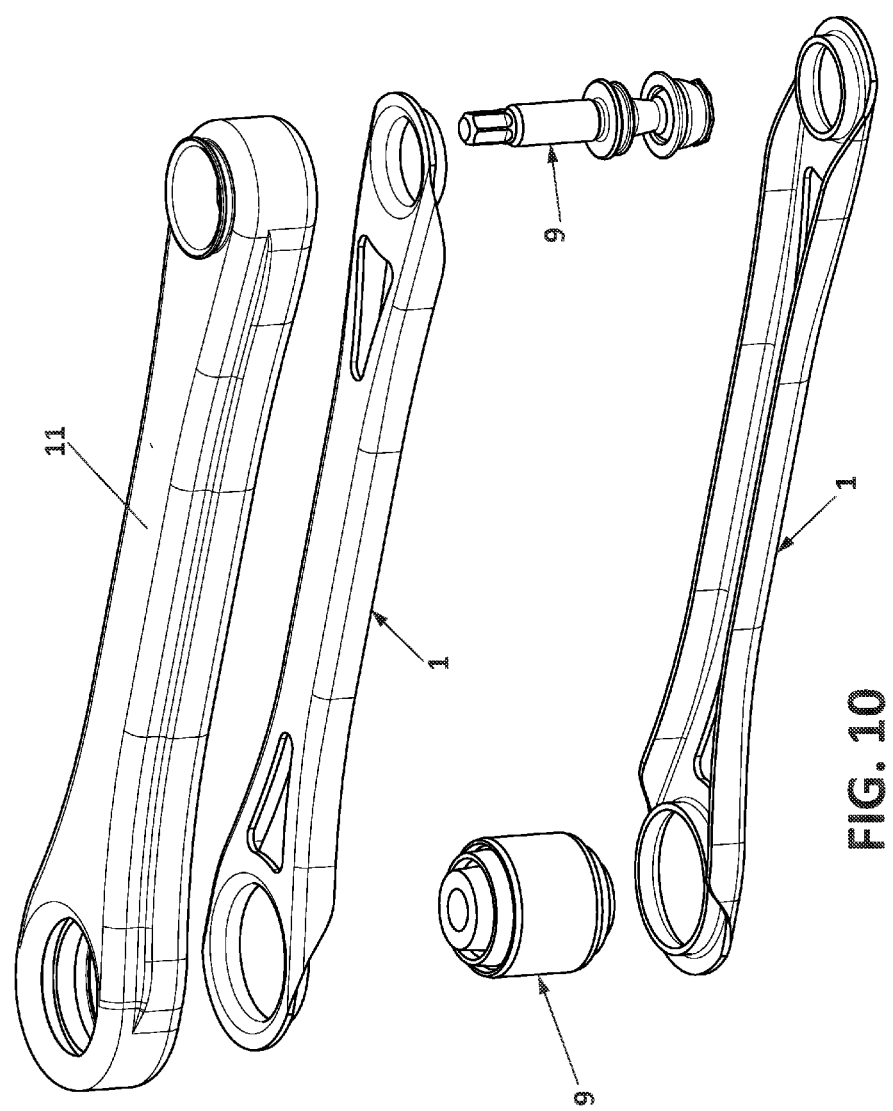
FIG. 10 shows an exploded view of the third embodiment of the suspension arm of the invention depicted in FIG. 9.
Figure 11:
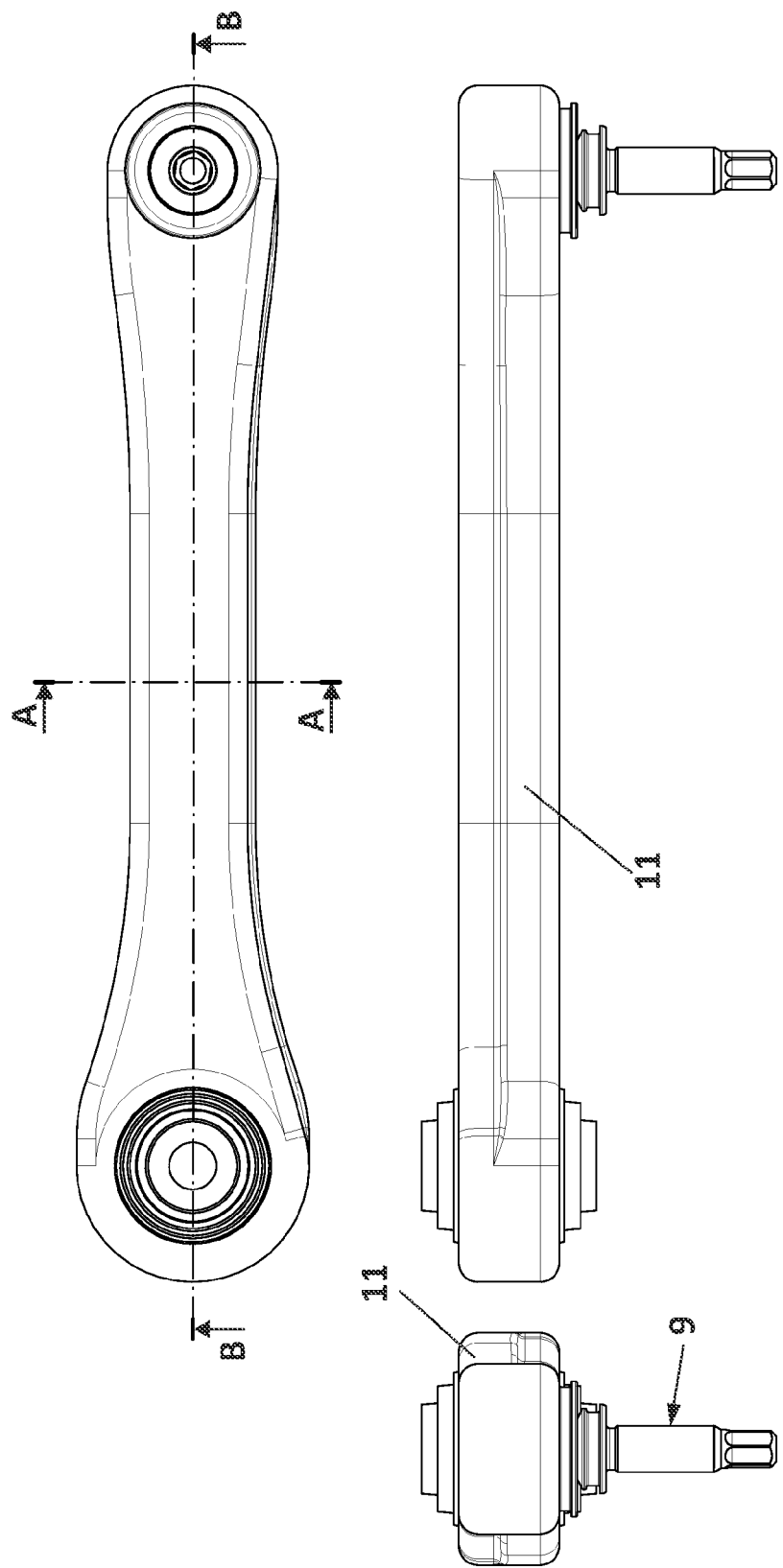
FIG. 11 shows three top, front and side views of the third embodiment of the arm of the invention.
Figure 12:
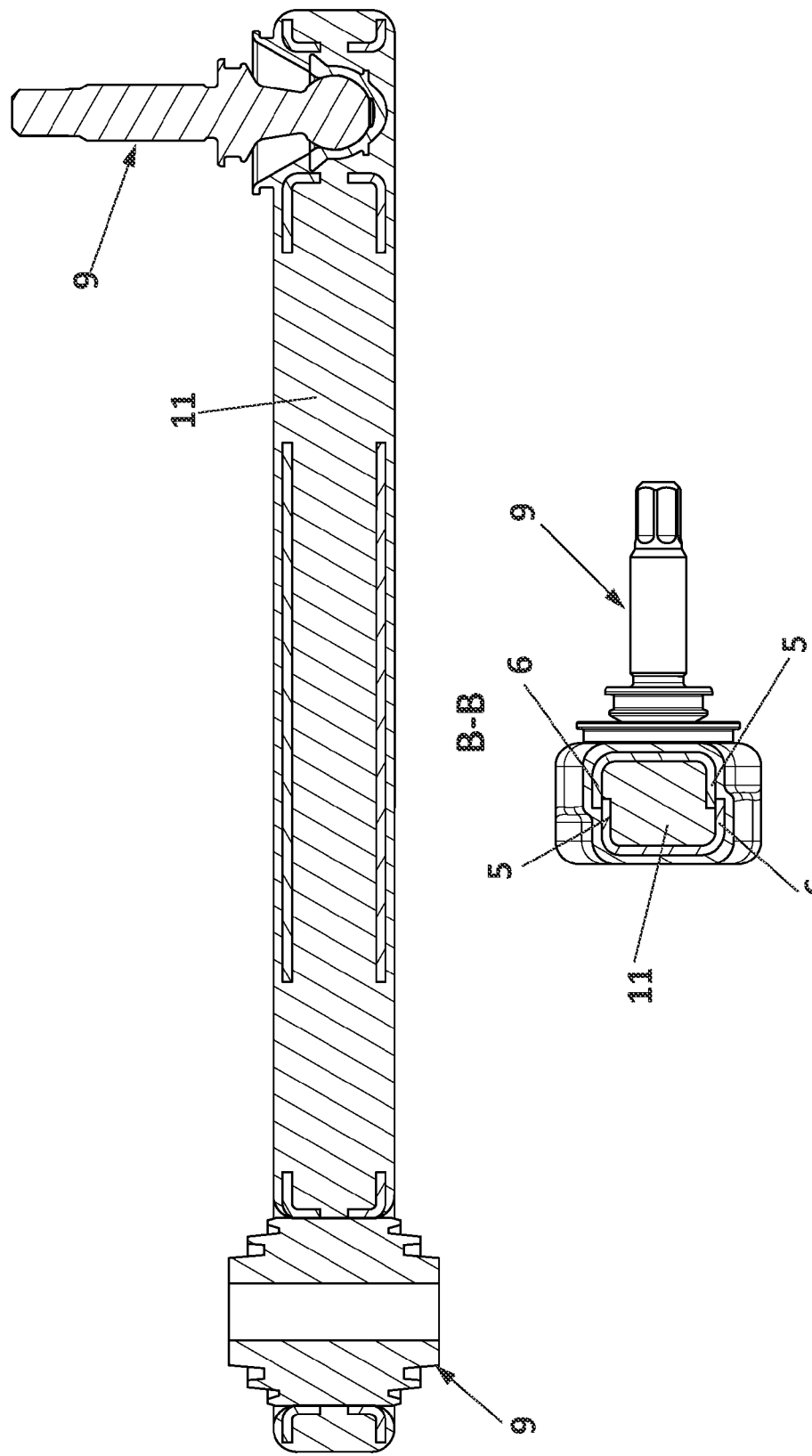
FIG. 12 shows two sections indicated in FIG. 11 of the third embodiment of the suspension arm of the invention.

On the other hand, FIGS. 6 to 8 show a second embodiment of the suspension arm obtained with the method of the invention, in which the connecting elements (9) also are elastic bearings and there are holes instead of drawn central areas (7), the flanges (5, 6) being in contact and the attachment being formed by means of a weld bead (10) precisely in the overlap area of the flanges (5, 6). In this case, the flanges (5, 6) are in contact, so the second flange (6) is separated from the midplane a distance equal to the separation of the first flange (5) from the midplane plus a distance equal to the value of the thickness of the sheet, so it can be said that the profile is closed.

Both in the event that the flanges (5, 6) are in contact, as in the second embodiment, and in the event that they are not, it is also considered that there is a overlap of the flanges in the attachment positions, as depicted in the drawings.

FIGS. 9 to 12 show a third embodiment of the suspension arm obtained with the method of the invention, in which the connecting elements (9) are an elastic bearing and a ball and socket joint, the flanges (5, 6) are in contact and the attachment is formed by means of overmolding a plastic material (11).

Obviously, embodiments of any type combining different connecting elements (9), whether they are ball and socket joints or elastic bearings, the presence or absence of drawn central areas (7) or holes in said area, or shapes and locations of the welding (10), fall under the invention defined by the independent claims.

The method can comprise after any step starting from a) punching holes.

The method can comprise after any step starting from a) performing at least one drawing in the central segment (2), forming a drawn central area (7) with an M-shaped cross-section.

The method can comprise after any step starting from d) attaching the parts (1) to one another in the drawn central areas (7), by means of welding (10) or any other method, such as gluing, for example.

The method can comprise after any step starting from step d) attaching the parts (1) by means of welding (10) for the case in which the flanges (5, 6) of both sheets are in contact, such that the sheets are attached in the overlap area by means of welding.

The method can comprise after any step starting from step d) bending or curving the longitudinal axis (8) of the arm.

The method can comprise after any step starting from step d) applying a surface coating.

The method can comprise after any step starting from step d) overmolding a plastic material (11) on the parts (1), as can be seen in FIGS. 9 to 12.

The method can comprise after any step starting from step d) assembling or mounting a connecting element (9) in each hole (4).

The method can comprise after step d) overmolding a plastic material in the area corresponding to the holes (4) in which a connecting element (9) is housed to integrate the necessary components in a ball and socket joint, as can be seen in the third embodiment depicted in FIGS. 9 to 12.

A second aspect of the invention relates to a suspension arm for automotive vehicle multi-link suspensions which can be obtained by means of the method described above.

The suspension arm for automotive vehicles comprises a body formed by two identical parts (1) obtained by means of cutting a sheet forming a base plane, such that a central segment (2) and two ends (3), and at least one hole (4) drawn in an area corresponding to each end (3), are defined, where each hole (4) has a geometric center.

According to the invention, each part (1) comprises in its central segment (2) two flanges (5, 6) obtained by drawing consisting of a first flange (5) and a second flange (6) located on opposite sides of the central segment (2) and oriented perpendicular to the base plane, where said flanges (5, 6) have an asymmetrical arrangement with respect to a midplane passing through the geometric centers of the holes (4) of the two ends (3) and is perpendicular to the base plane, the second flange (6) being separated from the midplane a distance equal to the separation of the first flange (5) from the midplane plus a distance at least equal to the value of the thickness of the sheet, where both parts (1) are facing and their corresponding base planes are parallel to one another, the flanges (5, 6) of both parts (1) being fitted to and overlapping one another, such that a overlap is defined in the flanges (5, 6).

In view of this description and set of drawings, the person skilled in the art will understand that the embodiments of the invention which have been described can be combined in many ways within the object of the invention. The invention has been described according to several preferred embodiments thereof, but for the person skilled in the art it will be obvious that multiple variations can be introduced in said preferred embodiments without exceeding the object of the claimed invention.

The invention claimed is:

1. A method for obtaining a suspension arm for automotive vehicles which comprises obtaining two identical parts to form a body, where each part is obtained by means of the following sequential steps:
   a) cutting a sheet metal or composite sheet forming a base plane, such that a central segment and two ends are defined, and
   b) drawing at least one hole in an area corresponding to each end, where each hole has a geometric center, characterized in that the method then comprises the following sequential steps:
   c) stamping or shaping each part forming in its central segment two flanges consisting of a first flange and a second flange located on opposite sides of the central segment and oriented perpendicular to the base plane, where said flanges have an asymmetrical arrangement with respect to a midplane passing through the geometric centers of the holes of the two ends and is perpendicular to the base plane, the second flange being separated from the midplane a distance equal to the separation of the first flange from the midplane plus a distance at least equal to the value of the thickness of the sheet or plate, and
   d) starting from two parts in the same position, rotating a first part 180° with respect to a longitudinal axis defined between the geometric centers of the holes of both ends until both parts are facing and with their corresponding base planes parallel to one another, moving both parts closer with the corresponding geometric centers of the holes aligned with one another, the flanges of both parts being fitted to and overlapping one another such that a overlap is defined in the flanges.

2. The method according to claim 1, further comprising, after any step starting from a), punching holes.

3. The method according to claim 1, further comprising after any step starting from a), performing at least one drawing or shaping in the central segment, forming a drawn or shaped central area with an M-shaped cross-section.

4. The method according to claim 1, further comprising after any step starting from step d), attaching the parts by means of welding.

5. The method according to claim 4, further comprising after any step starting from step d), attaching the parts in the drawn or shaped central areas by means of welding.

6. The method according to claim 4, further comprising after any step starting from step d), attaching the parts by means of welding in the overlap area of the flanges.

7. The method according to claim 1, further comprising after any step starting from step d), bending the longitudinal axis of the arm.

8. The method according to claim 1, further comprising after any step starting from step d), applying a surface coating.

9. The method according to claim 1, further comprising after any step starting from step d), overmolding a plastic material on the parts.

10. The method according to claim 1, further comprising after any step starting from step d), assembling a connecting element in each hole.

11. The method according to claim 1, where at least one connecting element is a ball and socket joint, further comprising after any step starting from step d), overmolding a plastic material where said at least one ball and socket joint is housed in at least one of the holes.

12. A suspension arm for automotive vehicles comprising a body formed by two identical parts obtained by means of cutting a sheet or plate forming a base plane, such that a central segment and two ends, and at least one hole drawn in an area corresponding to each end, are defined, where each hole has a geometric center,
   characterized in that each part comprises in its central segment two flanges obtained by drawing or forming, consisting of a first flange and a second flange located on opposite sides of the central segment and oriented perpendicular to the base plane, where said flanges have an asymmetrical arrangement with respect to a midplane passing through the geometric centers of the holes of the two ends and is perpendicular to the base plane, the second flange being separated from the midplane a distance equal to the separation of the first flange from the midplane plus a distance at least equal to the value of the thickness of the thermoplastic plate or sheet, where both parts are facing and their corresponding base planes are parallel to one another, the flanges of both parts being fitted to and overlapping one another, such that an overlap is defined in the flanges.

13. A suspension arm according to claim 12 which is obtainable by means of the method according to claim 1.

* * * * *